United States Patent [19]

Fry et al.

[11] Patent Number: 4,653,965

[45] Date of Patent: Mar. 31, 1987

[54] AUTOMATIC MICA UNDERCUTTER

[75] Inventors: Richard M. Fry; Charles A. McGough, III, both of Hanover, Pa.

[73] Assignee: Cam Industries, Inc., Hanover, Pa.

[21] Appl. No.: 766,596

[22] Filed: Aug. 19, 1985

[51] Int. Cl.[4] ............................................. B23C 1/26
[52] U.S. Cl. ..................................... 409/188; 409/147; 409/176; 409/197; 29/27 B
[58] Field of Search ............... 409/146, 147, 148, 176, 409/177, 183, 185, 186, 187, 175, 193, 194, 195, 218, 220, 231, 239, 241, 168, 184, 198; 408/8, 9, 11, 13, 12, 16, 237, 116, 140; 51/244; 29/33 L, 27 B, 597

[56] References Cited

U.S. PATENT DOCUMENTS

| 1,928,697 | 10/1933 | McFarland et al. | 409/176 |
| 2,400,933 | 5/1946 | Johnson et al. | 409/176 |
| 4,131,837 | 12/1978 | Whetham | 408/11 |
| 4,222,692 | 9/1980 | Paulousky | 409/231 |

FOREIGN PATENT DOCUMENTS

| 36392 | 3/1977 | Japan | 409/176 |
| 28442 | 2/1983 | Japan | 409/175 |

Primary Examiner—Z. R. Bilinsky
Assistant Examiner—A. Dougas
Attorney, Agent, or Firm—Daniel J. O'Connor

[57] ABSTRACT

An improved machine for undercutting the commutator of a DC motor. Designed specifically to undercut the mica insulation slots of a commutator, the device includes drive means to allow slippage of an undercutting assembly so that saw and spindle assembly damage are avoided. The invention also incorporates an automatic skewing attachment which indirectly senses misalignment of mica slots to be undercut and acts to reposition the commutator as needed so that the mica slot undercutting process may continue.

1 Claim, 4 Drawing Figures

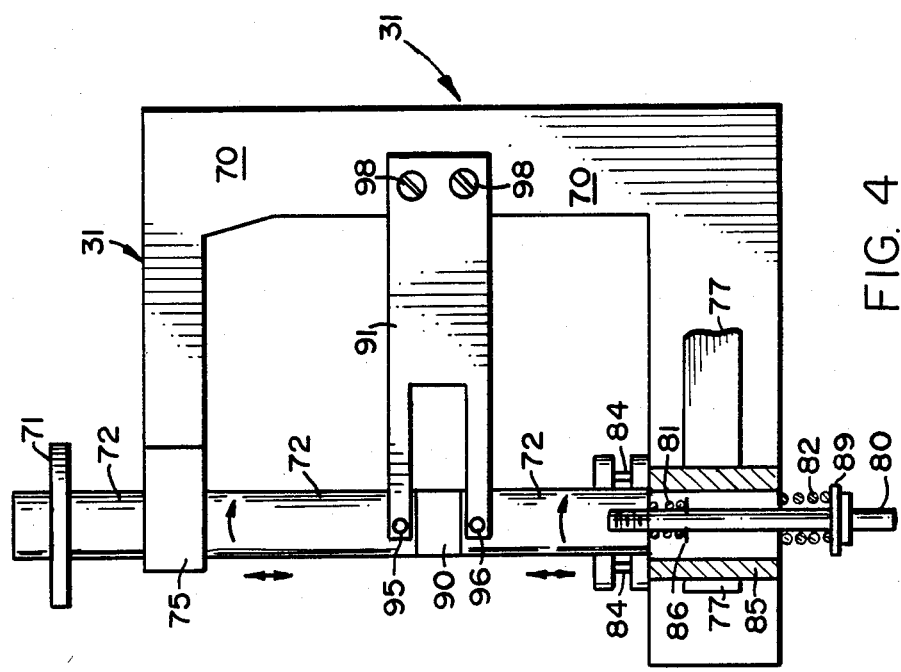

AUTOMATIC MICA UNDERCUTTER

BACKGROUND OF THE INVENTION

Commutators comprise a circular series of radially extending bars of predetermined length which are provided on one end of armatures of many types of electric motors and generators. The bars are insulated from each other by relatively thin sheets of mica. The overall exterior surface of a commutator of this type is substantially cylindrical and the inner ends of said bars are appropriately connected electrically to the windings of the armature. The commutators are engaged by carbon brushes which slidably engage the bars of the commutator in order to establish certain successive momentary electrical contacts therewith. The brushes normally are spring-pressed toward the commutator so that there is continual, gradual wearing of the outer surfaces of the commutator bars and the ends of the carbon brushes which engage the same.

When commutators are being manufactured, the outer surface thereof usually is machined to establish a uniform overall cylindrical configuration. At this stage, the outer edges of the mica insulation strips normally are coextensive with the outer surfaces of the commutator bars which usually are made of copper. It is necessary to cut away the outer edge portions of the mica strips to a predetermined depth because it is harder than the copper and causes undue wear of carbon brushes if they are permitted to engage the same. Such cutting away of the outer edges of the mica strips is known as undercutting the same. Such undercutting is performed on specialized machines adapted to that purpose and provided with narrow cutters capable of effectively cutting or milling the outer edges of the mica sheets.

Further, when commutators become worn to such extent that the outer edges of the mica insulating strips are substantially even with the worn outer surfaces of the copper bars, it is necessary to machine the commutators to reestablish a desired operative surface. When in such worn condition, it is not uncommon that the surfaces of the bars which are engaged by the carbon brushes actually have shallow grooves worn therein by said brushes and it is necessary to restore the outer surface of the commutator to a substantially cylindrical shape and thereby remove said grooved effects. This is done by machining the outer surface of the commutator in an appropriate cutting lathe and, as in regard to when the armature is newly manufactured, it then is necessary to undercut the insulating strips of mica to dispose the outer edges thereof at a level below the overall cylindrical outer surface of the commutator.

This invention pertains to the mica undercutting machines which perform the above outlined undercutting process.

It has been known in the prior art to drive an undercutting assembly along a shaft via a rack and pinion drive for a distance corresponding to the length of a mica slot to be undercut. Prior art systems have utilized limit switches to control the length of traverse of an undercutting saw. These switches can be in the form of mechanical limit switches or proximity sensors.

Since the proximity sensors are manually set in place, a possibility of error arises which may, for example, result in the saw running into the riser of the armature and consequent damage to the saw blade and spindle damage.

It has also been known to utilize an undercutting saw blade which is mounted on a floating spindle assembly to accommodate a particular problem in the art, namely the skew which sometimes exists in the mica slots. Under ideal manufacturing conditions, the mica slots would lie parallel to the axis of the armature and commutator. However, due to manufacturing inaccuracies and the difficulty of working with mica, the resulting mica slots may be skewed or out of alignment with the center line of the armature axis.

Prior art floating spindle assemblies were designed to accommodate the above mentioned skew of the mica slots by allowing the saw blade to float up and down and thereby stay within and appropriately undercut the mica slots.

However, if the skew is relatively large, as has been found in some instances in commutators for DC motors in the mass transit field, the floating spindle design cannot adjust for this larger skew and it becomes necessary to manually adjust the machine to undercut the skewed mica slots. Each time the machine is adjusted for skewed slots, it must be readjusted for automatic operation.

Accordingly, it is an object of the present invention to provide a drive means for an undercutting assembly which will not result in damage to the saw blade and spindle assembly should there be an inaccurate location of the proximity sensors or should there be a failure of the proximity sensors to effectively halt the traverse of the undercutting assembly.

It is a further object of the present invention to provide an automatic skew compensator attachment as a part of the floating spindle assembly which will enable an overall undercutter assembly to compensate for the large amount of mica slot skew present in some DC motor commutators.

These and other objects and advantages of the present invention will become apparent to those of skill in the art in the detailed description which follows.

BRIEF DESCRIPTION OF THE DRAWINGS

FIG. 4 shows the floating spindle assembly with means to compensate for excessive skew in a mica slot to be undercut.

DETAILED DESCRIPTION OF THE INVENTION

Figure 1:
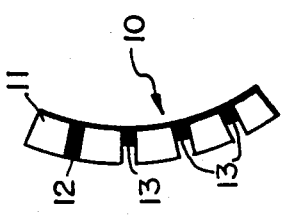
FIG. 1 is a partial sectional end view of a DC motor commutator.

As shown in FIG. 1 in partial view, a DC motor commutator 10 comprises cylindrically arranged copper bars 11 between which are placed mica insulating strips 12 and 13. As before described, it is necessary that the mica strips be undercut to a level beneath the outer surface of the copper bars 11 to prevent excessive brush wear when the commutator is installed in a DC motor. Numeral 12 shows a mica slot before undercutting while numerals 13 indicate mica slots which have been undercut to an appropriate desired level.

Figure 2:
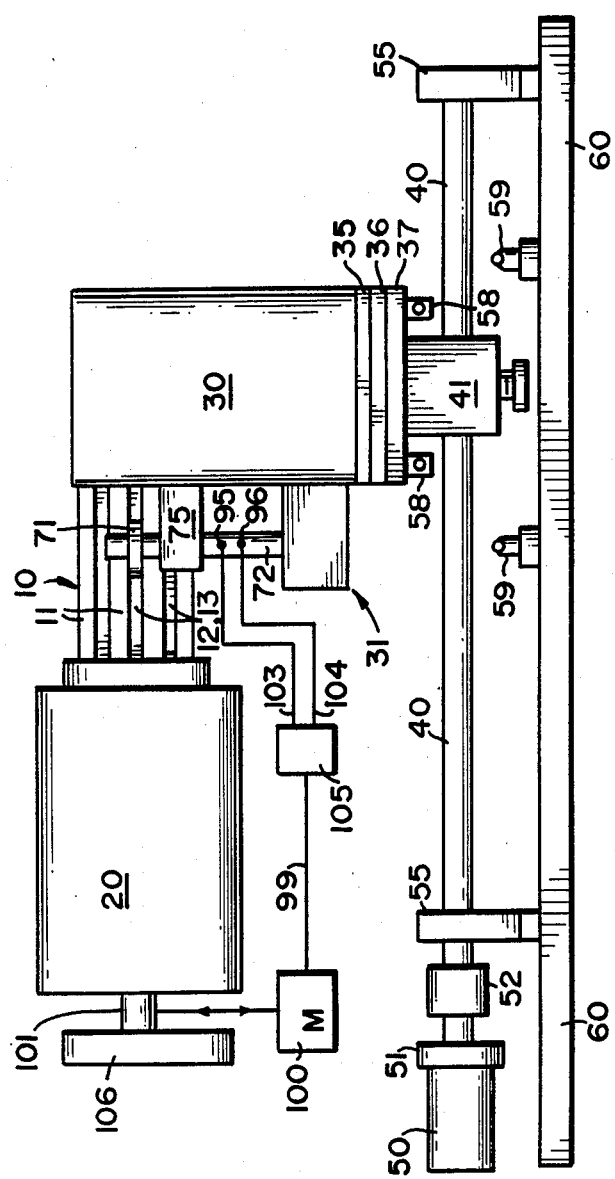
FIG. 2 is a side schematic elevational view of the overall undercutting assembly.

To accomplish the undercutting process, the commutator 10 and its attached armature 20 are loaded onto an undercutting machine as shown in side schematic view at FIG. 2. A riser element 21 is also part of the armature-commutator structure.

As shown in FIG. 2, the undercutting of the commutator 10 is accomplished by means of an undercutter assembly 30 which has attached thereto a floating spindle assembly 31 and undercutting saw 71. The floating spindle assembly and attachments thereto will be more fully described with reference to FIG. 4.

The undercutting saw 71 is of a rotary type known in the art as evidenced by U.S. Pat. No. 2,400,933 issued to Johnson. As is knwn from the prior art Johnson patent, a type of rotary saw is utilized which avoids damage to the commutator bars 11 when a condition of slight irregularity, i.e. mica slot skew, is encountered during the undercutting operation. The undercutting saw 71 is shaped so as to undercut to a depth shown at 13 in FIG. 1.

Referring again to FIG. 2, the undercutter assembly 30 is shown as resting on an undercutter pedestal 35 beneath which is shown a dovetail slide layer 36 by which the undercutting saw 71 is manually moved into position to undercut the mica slot. The undercutter assembly 30 is further mounted on carriage 37 and the entire assembly is driven along shaft 40 via drive interconnection means 41. The rotary shaft 40 is supported at each end by bearings 55.

Shown to the left of FIG. 2, motor 50 rotates the shaft 40 via a gear box 51 and a flexible cushioned start coupling 52 as is known in the art. Bearings 55 are supported on a bed 60. Thus, in the basic operation of the device, motor 50 rotates shaft 40 and the rotary motion of shaft 40 is converted into linear motion of the undercutter assembly 30 by the drive interconnection means 41, which will be more fully described.

Shown as mounted on the underside of carriage 37 are two proximity sensors 58. These sensors 58 act in conjunction with stops 59 mounted on bed 60 to control the length of traverse of the spindle assembly 31 and attached cutting saw 71 along the mica slot to be undercut. Proximity sensors 58 are of the type which create a magnetic field and when said magnetic field is disturbed by reason of passing in close proximity to stops 59, a signal is sent to motor 50 which appropriately stops rotation of shaft 40 to thereby end the traverse of the cutting path.

The drive interconnection means 41 of FIG. 2, which converts the rotary motion of shaft 40 into the linear motion of the undercutter assembly 30, has traditionally been of the rack and pinion or similarly functioning type. Thus, if stops 59 were inaccurately located by the machine operator or if there were a failure of proximity sensor 58 function, the undercutter assembly 30 could be driven into the riser 21 causing severe damage to the undercutting saw 71 and spindle assembly 31 by reason of the direct rack and pinion drive between the shaft 40 and undercutter assembly 30.

In order to avoid these potential costly damages to the machine, a different drive interconnection means 41 has been substituted for the conventional rack and pinion drive.

Figure 3:
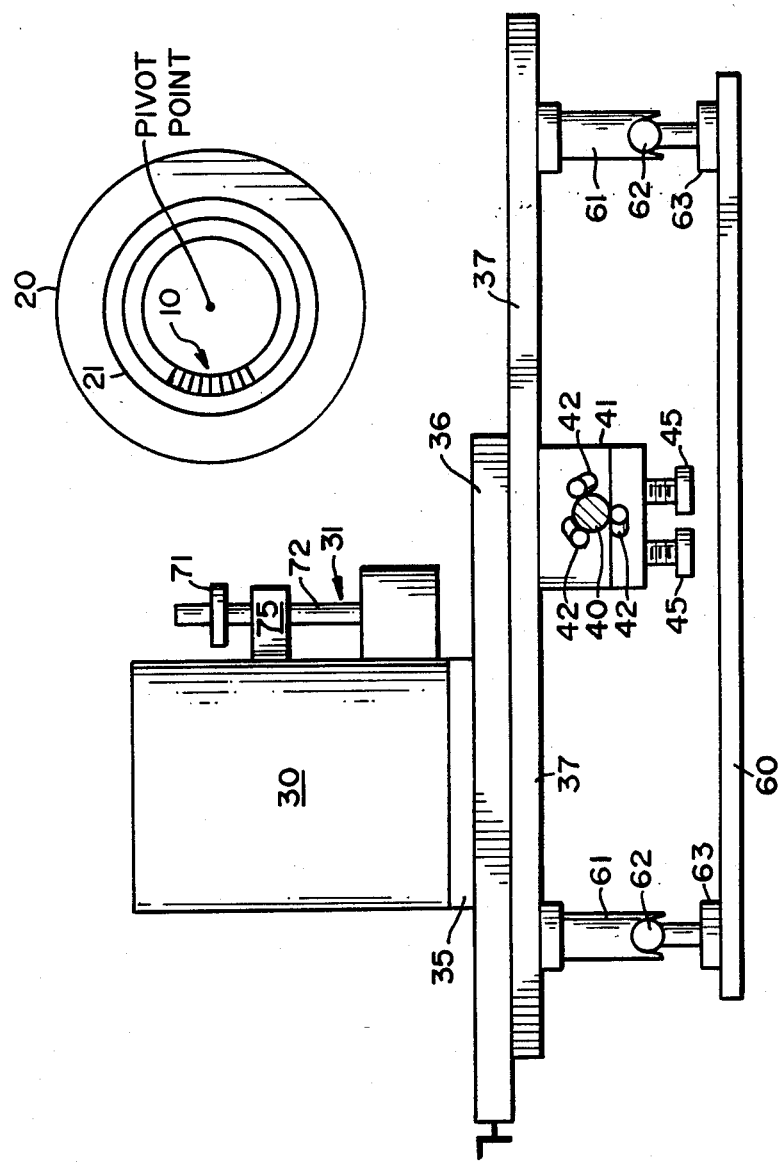
FIG. 3 is an end schematic view of the overall undercutting assembly.

As shown more clearly in FIG. 3, the drive interconnection means 41 of the present invention comprises multiple angled cylindrical bearings 42 which are located in a housing around shaft 40. The cylindrical bearings 42 act to convert the rotary motion of shaft 40 into linear motion of the carriage 37 and attached undercutter assembly 30. The pressure which the cylindrical bearings 42 exert on shaft 40 can be adjusted via tightening bolts 45. However, should an obstruction be encountered, as in the case aforementioned when the saw blade attached to spindle assemble 31 could contact riser 21, the shaft 40 would continue to rotate without exerting a strong driving force on the carriage 37 as would be the case with a rack and pinion drive interconnection means. Thus, severe damage to the spindle assembly and saw blade can be avoided. The rotary shaft 40 continues to rotate in effect in an idle mode when the carriage 37 encounters an obstruction as in the case when the carriage mounted spindle assembly contacts the riser 21.

The drive interconnection means 41 which has been successfully applied by applicant in the present invention is the Rohlix manufacture by Zero-Max, Inc.

As is also shown in FIG. 3, mounted on the underside of carriage 37 are ball bushings 61 which are shaped to receive load bearing shafts 62 therein. The shafts 62 run parallel to the central rotary shaft 40 and are designed to receive the entire weight load of the carriage 37 by reason of supports 63 and bedding 60.

FIG. 3 also illustrates the function of dovetail slide element 36 which is manually adjusted by the machine operator to locate the spindle assembly 31 and saw blade 71 in the appropriate mica undercutting position with regard to the commutator 10.

Referring now to FIG. 4 which shows the floating spindle assembly 31 in further detail, the mica undercutting saw 71 is shown as fixedly attached to spindle 72 which is capable of rotary motion by reason of its location in bearing 75 at the upper location of the spindle bracket 70. It is to be understood that the lower end of spindle 72 and thus the saw blade 71 is turned by belt drive 77 from a motor mounted as a part of the undercutting assembly 30 which has attached thereto the spindle assembly 31 as previously shown generally in FIGS. 2 and 3.

As further shown in FIG. 4, a spring rod 80 is threadedly engaged with the lower end of spindle 72. Mounted around the spring rod 80 are two springs 81 and 82 which serve to allow the spindle 72 to float up and down. The spindle 72 rotates through the contact of dowel pins 84. Upper spring 81 is mounted on an inner landing 86 of the assembly. Lower spring 82 is retained in position by a flex-lock nut assembly 89.

The spindle 72 and attached saw blade 71 are thus rotated via belt 77 applied to drive collar 85 and the spindle 72 can float up and down by reason of springs 81 and 82 and dowel pins 84. See the arrows in FIG. 4 indicating rotary and up and down motion of spindle 72. With this arrangement, should the saw blade 71 encounter a mica slot section which is skewed or out of alignment, the floating spindle 72 compensates and allows the saw to continue along its appropriate mica undercutting pathway.

The above described floating spindle arrangement has been used successfully to allow continued automatic mica undercutting in situations where the skewing has been relatively minor.

However, the floating spindle arrangement cannot adequately compensate for situations where the skewing is severe, i.e. where the mica slots to be undercut are greatly out of allignment with the commutator axis. Thus, situations have been encountered where manual adjustment or undercutting have been required even with a floating spindle structure due to the severe mica slot skewing present in a commutator.

In order to overcome this problem, applicant has devised a sensing and control system to automatically allow the saw blade 71 to continue its proper undercutting function even under conditions of severe mica slot skewing.

In this arrangement, shown also in FIG. 4, a portion of the spindle 72 is coated with a flat black paint at 90. In practice of the invention, it is contemplated that the portion 90 of spindle 72 will be turned to a shallow depth and the nonreflective black paint be applied to section 90 thereafter.

A sensor retaining bracket 91 is then affixed to the undercutting spindle bracket 70 by appropriate bolt or weld attachment means 98 or bracket 91 may be formed as a one-piece assembly with bracket 70 as desired. Positioned on the sensor retaining bracket 91 are two light sensing elements 95 and 96. As shown schematically in FIG. 4, the light sensing elements 95 and 96 are placed so as to be able to sense when blackened portion 90 passes over one or the other of said sensors 95 and 96 by reason of the float inherent in spindle 72.

As previously described, spindle 72 is able to float up and down when saw blade 71 encounters a slight skew condition present in the mica slot to be undercut. Such floating is accomplished by reason of lower springs 81 and 82, spring rod 80, and dowel pin connectors 84.

When a high degree of skew is present on the mica slot to be undercut, it has been found to be necessary to adjust the angle of the commutator workpiece itself, i.e. the floating spindle concept is not sufficient to undercut mica slots which have a severe skew.

Such adjustment of the commutator is accomplished via sensors 95 and 96. When blackened portion 90 of spindle 72 passes over one or the other of sensors 95 or 96, a condition of severe skew is indicated and a signal is sent via lines 103, 104 to a programable controller 105 which, via line 99, signals motor 100 to raise or lower the pinion 101 by which the armature 20 has previously been attached to the headstock 106 of the undercutting machine. The control functioning is shown in FIG. 2. In this manner, the attached commutator 10 is also slightly raised or lowered an appropriate amount so that the proper mica slot undercutting can continue automatically even under conditions of high skew.

It is noted that the right hand side of commutator 10 would also be fixed to the undercuting machine via a second pinion so that when motor 100 raises or lowers the first pinion 101, the commutator 10 turns about a pivot point illustrated in FIG. 3.

The above system thus allows automatic skew compensation even under conditions where the commutator mica slots have severe skew so that the entire commutator can be automatically machine undercut without the need to manually undercut mica sections having a high degree of skew.

The system of the present invention has been found to have significant utility when applied to relatively small commutators used by the mass transit industry where conditions of high mica slot skew are sometimes encountered. It is to be understood, however, that the principles set forth herein would be applicable to any size commutator wherein significant skew conditions are present.

From the foregoing description, it will be seen that the present invention incorporates at least two novel features of significance in the commutator undercutting industry. First, the cylindrical bearing Rohlix drive allows the saw to perform its undercutting function without a risk of serious damage to the saw and spindle assembly by reason of failure or mislocation of the proximity sensor elements. Secondly, the use of sensors 95 and 96 to detect conditions of high skew via the float present in spindle 72 allow the undercutter to perform its intended function even when working on commutators with a high degree of mica slot skew.

Since undercutting machines are used on a worldwide basis and often in rather remote locations, the enhancement of reliability and performance of such machines by reason of the inventive concepts set forth herein is a significant improvement in the state of the undercutting art.

It should be understood that the invention is not to be limited to the precise details herein illustrated and described since the same may be carried out in other ways falling within the spirit and scope of the invention as set forth in the specification and the appended claims.

I claim:

1. An automatic mica undercutter machine means for undercutting mica slots in a commutator of a DC motor wherein the machine comprises:
    means (101, 106) for mounting a combined armature and commutator assembly on said machine, said means including a pinion (101) and a headstock (106).
    an undercutting assembly (30) reans mounted as part of said undercutter machine,
    said undercutting assembly (30) including a spindle assembly (31) and undercutting a saw blade (71) mounted as a part thereof,
    said undercutting assembly (30) being mounted on a carriage means (37) for moving said undercutting assembly the length of a mica slot (13) to be undercut,
    said undercutting assembly (30) being driven along a rotary shaft (40) by drive interconnection means (41),
    said drive interconnection means (41) including means (42, 45) whereby said undercutting assembly will slip or idle on shaft (40) should an obstruction such as a riser (21) be encountered in the path of the spindle assembly (31) to thereby prevent damage to said spindle assembly and said saw blade (71),
    said spindle assembly (31) including a spindle (72) means capable of upward and downward motion in a floating manner should a skew condition be encountered in a mica slot (13) to be undercut,
    means (90, 95, 96) for sensing upward and downward motion of said spindle (72) and means for signaling (99) the position of said spindle,
    motor means (100) in response to said signal (99) for moving said commutator (10) to adjust for a condition of severe skew present on the mica slots of said commutator,
    means whereby said saw blade (71) will continue to perform its undercutting function even under conditions of high skew present on the commutator mica slot to be undercut comprising utilizing said motor means (100) for the amplication of force (via motor means (100)) to raise or lower (a) the pinion (101) by which the armature (20) and commutator (10) assembly has been attached to the undercutter machine,
    wherein said spindle (72) has a blackened non-reflective section (90) formed thereon,
    and means for mounting optical sensor elements (95, 96) adjacent to said blackened section (90) of said spindle (72),
    wherein said spindle assembly (31) includes an undercutting spindle bracket means (70) for operatively receiving said spindle (72) and an optical sensor mounting bracket means (91) (being) fixed to said undercutting spindle bracket (70) for the positioning of said optical sensor elements (95, 96).

* * * * *